Patented Nov. 13, 1951

2,574,500

UNITED STATES PATENT OFFICE 2,574,500

HYDROXYDIKETONES

Milton S. Schechter, Washington, D. C., and Frederick B. La Forge, Arlington, Va.; dedicated to the free use of the People in the territory of the United States No Drawing. Original application May 11, 1950, Serial No. 161,481. Divided and this application June 14, 1950, Serial No. 168,142

18 Claims. (Cl. 260—590)

(Granted under the act of March 3, 1883, as amended April 30, 1928; 370 O. G. 757)

The invention herein described may be manufactured and used by or for the Government of the United States of America for governmental purposes throughout the world without the payment to use of any royalty thereon.

We hereby dedicate the invention herein described to the free use of the people in the territory of the United States to take effect on the granting of a patent to us.

This invention is directed to the preparation of hydroxydiketones which can be cyclized to cyclopentenolones. It particularly relates to new processes of preparing hydroxydiketones utilizable as intermediates in the synthesis of esters closely related to the pyrethrins and having their characteristic insecticidal properties.

This application is a division of our application Serial No. 161,481, for cyclopentenolone esters filed May 11, 1950, and is a continuation in part of our application, Serial No. 75,282 filed February 8, 1949.

A particular object of this invention is to provide a process for making a new class of hydroxydiketones which can be ring closed to yield 4-hydroxy 2-cyclopenten-1-ones useful in the synthesis of esters related to the pyrethrins, as set forth in detail in our said prior applications.

Some of the hydroxydiketones prepared according to the invention are of the following Formula I:

Formula I 

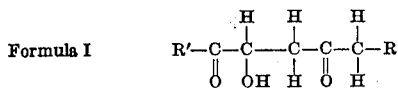

R may be a hydrocarbon radical or substituted hydrocarbon radical such as alkyl, for example, methyl, ethyl propyl, isopropyl, n-butyl, secondary butyl, tertiary butyl, n-amyl, secondary and tertiary amyl, n-hexyl and isomers, heptyl, octyl, nonyl, dodecyl, octadecyl, and substituted alkyl, alkenyl such as allyl, 2-methylallyl, vinyl, and 2- or 3-butenyl, substituted alkenyl such as 2- or 3-chloroallyl, alkynyl such as 2-propynyl, alkadienyl, such as 2, 4-pentadienyl, alkatrienyl, aryl such as phenyl and naphthyl, alkylaryl such as xylyl, aralkyl such as benyl and phenylethyl, aralkenyl such as cinnamyl, cycloalkyl such as cyclopropyl, cyclohexyl and cyclopentyl, and cycloalkenyl such as cyclohexenyl. R may also be a heterocyclic radical such as furfuryl or thenyl.

R' may be alkyl such as methyl, ethyl, propyl, isopropyl, butyl, secondary and tertiary butyl, amyl and isomers, octyl, decyl, and heptadecyl, substituted alkyl, alkenyl or substituted alkenyl, aryl such as phenyl, methyl phenyl, xylyl, substituted aryl, aralkyl such as benzyl and phenylethyl, aralkenyl such as styryl, and cycloalkyl such as cyclohexyl and cyclopentyl.

It is obvious that a great variety of radicals may be utilized as R and R'. Thus R can originate from any known or preparable beta-keto acid compound of the type formula

R—CH$_2$—CO—CH$_2$—COOM where M is hydrogen or an alkali metal such as sodium or potassium. R' can originate from any known or preparable substituted glyoxal of the type formula R'—CO—CHO.

The synthesis of the hydroxydiketones, in one modification, comprises reacting in substantially equi-molecular proportions at room temperature or below, the substituted glyoxal with the beta-keto acid or with one of its alkali salts, preferably at a pH of about 5 to 9.

It is inadvisable to have the solution too alkaline or too acidic. If it is too alkaline some of the substituted glyoxal may rearrange to a hydroxy acid, whereas if it is too acidic, some of the beta-keto acid may decompose; in either case, the yields of desired product will be lowered. To maintain the pH within desired limits, the reaction may be carried out in the presence of buffers, or else acid or alkali may be added as the reaction proceeds. The substituted glyoxal may be used pure or in solution. If the substituted glyoxal is only moderately soluble in water, such as phenylglyoxal, the reaction mixture may be agitated or a co-solvent such as alcohol may be added. Provided that the solution is not made too acidic nor too alkaline at first, the pH will tend to adjust itself to a suitable value because of the production of alkali bicarbonate, the reaction probably taking place by the mechanism shown in Equation I, where M is an alkali metal such as Na or K.

EQUATION 1

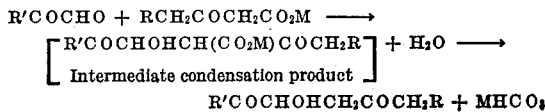

That the intermediate condensation product (not isolated) of Equation 1 decarboxylates spontaneously is evident for several reasons. Firstly, in those cases where R is large enough to render the hydroxydiketone difficultly soluble in water (for example where R is butyl), the hydroxydiketone separates out of the reaction mixture as an oil during the progress of the reaction. Secondly, when the reaction is run under alkaline conditions, the hydroxydiketone may be extracted directly from the reaction mixture which is still faintly alkaline at the end of the reaction. Thirdly, when the reaction is run under alkaline conditions, after having extracted the hydroxydiketone, a titration of the remaining extracted liquid for alkali bicarbonate indicates that practically the theoretical amount is produced.

If, by means of buffers or by the addition of acid, the reaction is run under acidic conditions, the formation of the intermediate condensation product takes place as shown in Equation 1, where M is now hydrogen rather than an alkali metal, and the carbon dioxide resulting from the decarboxylation of the intermediate condensation product is liberated as a gas instead of appearing as alkali bicarbonate.

The mechanisms proposed above are not to be considered as limiting the invention in any way since the reactions may actually take place in a different manner.

The reactions are usually substantially complete in about six hours at room temperature but may be allowed to proceed for a longer period. The hydroxydiketones may be separated from the reaction mixtures, dried, and distilled in vacuo, or they may be extracted with a solvent such as ether. The ether solution is then washed, dried, and the ether evaporated, the residue being subjected to distillation in high vacuum. The yields usually are from about 50% to 75% of the theory. Whereas we prefer aqueous or aqueous-alcoholic solutions, it is within the scope of this invention to carry out the preparation of the hydroxydiketones in organic solvents. Specific examples of the preparation of hydroxydiketones of the type illustrated in Formula I will be described in the experimental section.

The beta-keto esters listed in table I below were prepared employing the general procedures described by Soloway and La Forge, J. Am. Chem. Soc., 69, 2677 (1947), Green and La Forge, J. Am. Chem. Soc., 70, 2287 (1948), and Wallingford, Homeyer and Jones, J. Am. Chem. Soc., 63, 2252 (1941), except for methyl 3-oxo-7-octenoate, which was prepared by the method of Harper, J. Chem. Soc., 892 (1946).

Several beta-keto acids were prepared by saponification of the corresponding esters with a slight excess of a 5 to 10% aqueous potassium hydroxide solution at about 5° for three days. Upon acidification to Congo red with dilute sulfuric or hydrochloric acid, the free keto acids were obtained. Beta-oxocaprylic acid, M. P. 75–76° (dec.) [c. f. Locquin, Bull. Soc. Chim. 31 (3), 597 (1904)], and 3-oxo-6-octenoic acid, M. P. 71–72° (dec.), were thus prepared. These acids are stable for months in the refrigerator but slowly decompose at room temperature with the liberation of carbon dioxide. 3-oxo-6-heptenoic acid was prepared in the same manner but was isolated as an oil which crystallizes on cooling with Dry Ice and melts on warming to room temperature with slow decomposition.

Pyruvaldehyde was prepared from acetone and selenium dioxide by the general procedure of Riley and co-workers [J. Chem. Soc. 1875 (1932); 621 (1938)]. Phenylglyoxal hydrate was prepared according to "Organic Synthesis," Collective vol. II, p. 509 (1943), John Wiley and Sons, Inc., New York, N. Y. The pyruvaldehyde was assayed by the methods of Friedmann, J. Biol. Chem., 73, 331 (1927) and Simon and Neuberg, Biochem. Zeit., 232, 479 (1931).

The procedures used by us in the preparation of the hydroxydiketones of Formula I are as follows:

*Procedure A.*—The beta-keto acid was isolated as described above, mixed with ice-cold water and exactly neutralized with cold 10% sodium hydroxide solution. The pyruvaldehyde, usually dissolved in a little water, was added and the alkalinity adjusted to approximately pH 8. It is immaterial if the pyruvaldehyde has polymerized during storage in the refrigerator since it either dissociates on standing in dilute aqueous solution or else a shift of equilibrium to the monomer occurs as it reacts. When phenylglyoxal hydrate, which is not very soluble in water, was employed, the reaction mixture was shaken or stirred.

If the reaction medium is too alkaline, some of the substituted glyoxal may be converted to a hydroxy acid before it can react with the salt of the beta-keto acid. In those cases where the hydroxydiketones are insoluble, the reaction mixture turns cloudy in about two hours and the oily reaction product separates practically completely during several more hours. The lower molecular weight hydroxydiketones may separate partially or not at all depending on their solubility and the volume of the reaction mixture. In these cases, the solutions were saturated with sodium chloride before extraction.

After a period of about sixteen hours to several days, the reaction mixture was extracted with peroxide-free ether. The ether solution was washed with saturated salt solution and after drying over sodium sulfate, the solvent was removed and the residue distilled in high vacuum. There was little or no forerun, but there was usually a fraction, not further investigated, having a considerably higher boiling point than the desired compound.

*Procedure B.*—This is the same as procedure A except that the beta-keto ester was saponified with a slight excess of a 5 to 20% potassium hydroxide solution for several days in the refrigerator. The excess alkali was neutralized with dilute sulfuric acid, the substituted glyoxal added, and the alkalinity adjusted to approximately pH 8.

*Procedure C.*—This is the same as Procedure B except that instead of neutralizing the alkaline solution of the beta-keto acid with dilute sulfuric acid, the solution was saturated with carbon dioxide using a porous disperser. The excess alkali is thereby converted to bicarbonate giving a suitable pH and the substituted glyoxal may be added without further adjustment of the alkalinity.

A number of hydroxydiketones of the type illustrated in Formula I, were prepared by these general procedures. Table II sets forth a number of hydroxydiketones prepared by one of procedures A, B, or C, and the reaction conditions, and physical constants of the hydroxydiketones. Table III presents the analytical data on the hydroxydiketones and their semicarbazone derivatives (prepared in pyridine-ethanol solution). The analyses of the semicarbazone derivatives indicated that water had been eliminated so that they are either anhydrodisemicarbazones or pyrazoline derivatives. The anhydrodisemicarbazones can be obtained in low- and high-melting forms depending on the solvent used for recrystallization.

Typical experiments describing the preparation of hydroxydiketones and some variations which may be employed follow:

*3-hydroxy-2,5-decanedione (Table II, compound A).*—Procedure A was used. Thirty grams of beta-oxocaprylic acid (0.19 mole) mixed with 50 ml. of cold water in a glass stoppered flask was kept cold in an ice bath and titrated with 10% sodium hydroxide solution until just alkaline to phenolphthalein. The stoppered flask was shaken vigorously near the end of the titration. Eighteen grams of pyruvaldehyde (87.6% assay) (0.22 mole) was added and rinsed in with a little water. The alkalinity of the reaction mixture was adjusted to approximately pH 8 using a pH test paper, by the careful addition of a little 10% sodium hydroxide solution. The total volume of the reaction mixture was 200 ml. In about two hours at room temperature, the solution turned milky and the oily reaction product which was forming rose to the surface. After two days, the reaction mixture was still faintly alkaline. It was extracted several times with ether, the extracts were combined and washed several times with saturated sodium chloride solution and after drying the extract over anhydrous sodium sulfate, the ether was distilled off leaving a residue of 32 g. of yellow oil which was distilled in vacuo. After a small forerun, the main fraction was collected at 89–95° (0.05 mm.) most of it distilling at 93–95, $n_D^{25}$ 1.4514; yield 23 g. (65%). There was also a higher boiling fraction, B. P. 150–155° at 0.15 mm., which was not investigated.

An aliquot of the reaction mixture, after it had been extracted by ether, was titrated for sodium bicarbonate using 1N sulfuric acid solution and methyl orange indicator, the solution being boiled near the end of the titration. The theoretical amount of sodium bicarbonate was found.

A similar experiment was performed starting with beta-oxocaprylic acid and pure pyruvaldehyde-sodium bisulfite compound (instead of pyruvaldehyde) with final adjustment of the alkalinity to approximately pH8. After standing for two days, very little oil separated. The reaction mixture was acidified to Congo red with dilute sulfuric acid (1:4) and heated for 15 min. on the steam bath under a reflux condenser in order to decompose any bisulfite addition compounds. The product was isolated as usual by extraction with ether and distillation in vacuo, giving only a 19% yield of 3-hydroxy-2,5-decanedione.

Another experiment was run using commercially available pyruvaldehyde. This product was supplied as an approximately 30% aqueous solution but it was noted that it contained formaldehyde, acidic substances, and other unknown impurities. Procedure B was used. Ninety-nine grams (0.53 mole) of ethyl beta-oxocaprylate was mixed with 195 ml. of an ice-cold solution containing 39 g. of potassium hydroxide (86% assay) (0.60 mole). After standing for three days in the refrigerator, the excess alkali was approximately neutralized by the slow addition of dilute sulfuric acid (1:4). One hundred and forty grams of commercial pyruvaldehyde (30%) (0.58 mole) was added and the solution adjusted to approximately pH 7.5–8 by the addition of 10% potassium hydroxide solution. The total volume of the reaction mixture was 537 ml. In ninety minutes, the reaction product began to separate as an oil which floated to the surface. After four hours, 104 ml. had separated after which there was no further increase. The next day the product was isolated in the usual manner by extraction with ether and distillation to yield, after a small forerun, 509 g. (52%) B. P. 105–110° at 0.4 mm., $n_D^{25}$ 1.4532. Redistillation gave 41.7 g., B. P. 90–98° at 0.05 mm., $n_D^{25}$ 1.4528.

To illustrate that the reaction can be run under acidic conditions, a solution of sodium beta-oxocaprylate (0.05 mole) was reacted with pyruvaldehyde in the presence of a buffer consisting of a solution of citric acid (0.1 mole) partly neutralized with sodium hydroxide. The initial pH of the reaction mixture was 4.9 and the reaction was allowed to proceed for 24 hours during which time carbon dioxide was evolved and the reaction product separated as an oil, the final pH being 5.1. Extraction and distillation of the product in the usual manner yielded 5.5 g. (59%) of 3-hydroxy-2,5-decanedione.

*3-hydroxy-8-nonene-2,5-dione (Table II, compound C).*—In addition to preparing this compound in the usual manner by procedure A from 3-oxo-6-heptenoic acid and pyruvaledhyde (see Table II, compound C) it was also prepared using pyruvaldehyde diethyl acetal as a source of pyruvaldehyde.

Seventeen and a half grams (0.12 mole) of pyruvaldehyde diethyl acetal was refluxed for one hour with 1.6 g. of concentrated sulfuric acid in 60 ml. of water. The solution was cooled in an ice bath and neutralized by the slow addition of about 3 g. of sodium bicarbonate. Procedure C was used. Starting with 17 g. (0.10 mole) of ethyl 3-oxo-6-heptenoate, saponified at 5° for several days with 7.1 g. of potassium hydroxide (87.5% assay) (0.11 mole) in 80 ml. of water, and the hydrolyzed pyruvaldehyde diethyl acetal solution, the reaction time being two days, 10.6 g. (62% yield) of distilled product was obtained, $n_D^{25}$ 1.4660.

Treatment of the hydroxydiketones with acetic anhydride and anhydrous sodium acetate led to the formation of anhydrocompounds of the type illustrated in Formula II. The disemicarbazones of these seems to be identical with the anhydrodisemicarbazones of the corresponding hydroxydiketones as proved by their analyses and mixed melting points. The analytical data on the anhydrocompounds and their disemicarbazones are presented in table IV.

Formula II

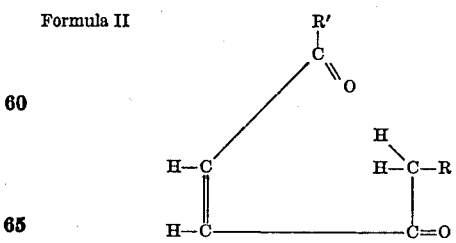

The anhydro compounds prepared were 3-decene-2,5-dione; 3,8-decadiene-2,5-dione; 3,8-nonadiene - 2,5 - dione; 3,9 - decadiene - 2,5- dione; from the corresponding hydroxydiketones.

For details of the ring closure of the hydroxydiketones to cyclopentenolones, and the esterification of the latter with cyclopropane carboxylic acids to make analogues of pyrethrin, see the parent applications referred to above.

TABLE I
Beta-keto esters

| | | Boiling point, °C. | Pressure, mm. | Refractive index, $n_D$ |
|---|---|---|---|---|
| A | Ethyl beta-oxocaprylate | 108–112 | 11 | 1.4326 (25°) |
| B | Ethyl 3-oxo-6-octenoate | 110–120 | 10 | 1.4460 (25°) |
| C | Ethyl 3-oxo-6-heptenoate | 107–111 | 14 | 1.4393 (28°) |
| D | Ethyl 6-methyl-3-oxo-6-heptenoate | 119–125 | 16 | 1.4468 (27°) |
| E | Methyl 3-oxo-7-octenoate | 114–122 | 16 | 1.4500 (25°) |
| F | Ethyl 7-methyl-3-oxo-6-octenoate | 135–136 | 15 | 1.4519 (25°) |

Supplementing the information presented above in relation to the preparation of beta-keto esters:

The following series of three reactions illustrates the preparation of the triple bonded intermediate, 1-chloro-2-butyne. This compound is employed below to make 2-acetyl-4-hexynoic acid ethyl ester, which is then converted to the ketone 5-heptyne-2-one. This ketone is one of

TABLE II
Hydroxydiketones of the type illustrated in Formula I

| | Product, Formula I | | Procedure | Starting ester[1] | | Pyruvaldehyde | | Reaction volume, ml. | Time, hours | Distilled Product | | | | $n_D^{25}$ |
|---|---|---|---|---|---|---|---|---|---|---|---|---|---|---|
| | R | R' | | grams | Table I | grams | Per cent assay | | | Yield | | Boiling point | | |
| | | | | | | | | | | grams | Per cent of theory | °C. | mm. | |
| A | –n–$C_4H_9$ | –$CH_3$ | A | 30 | A | 18 | 87.6 | 200 | 48 | 23 | 65 | 89–95 | 0.05 | 1.4514 |
| B | –$CH_2CH=CHCH_3$ | –$CH_3$ | A | 50.4 | B | 29.5 | 90 | 290 | 72 | 44.7 | 75 | 97–100 | 0.1 | 1.4679 |
| C | –$CH_2CH=CH_2$ | –$CH_3$ | A | 50 | C | 32.2 | 90 | 270 | 72 | 35 | 58 | 85–90 | 0.07 | 1.4657 |
| D | –$CH_2C(CH_3)=CH_2$ | –$CH_3$ | C | 44 | D | 24 | 76 | 254 | 24 | 25.7 | 58 | 98–102 | 0.3 | 1.4687 |
| E | –$CH_2CH_2CH=CH_2$ | –$CH_3$ | C | 50 | E | 32.2 | 72.4 | 255 | 16 | 38.4 | 77 | 94–97 | 0.2 | 1.4675 |
| F | –$CH_2CH=C(CH_3)_2$ | –$CH_3$ | C | 47.5 | F | 25 | 76 | 300 | 24 | 32.2 | 68 | 106–109 | 0.5 | 1.4715 |
| G | –$CH_2CH=CH_2$ | –$C_6H_5$ | B | 28 | C | [2] 22.5 | | 210 | 24 | 23.3 | 68 | [3] 154–157 | 0.8 | |
| H | –H | –$CH_3$ | C | [4] 65 | | 41.4 | 88.6 | | 72 | [5] 24.1 | 37 | 62–67 | 0.5 | 1.4497 |

[1] See Table I for the esters; where procedure A was used, the weight refers to the beta-keto acid, not the ester.
[2] Phenylglyoxal hydrate.
[3] This compound could be crystallized, M. P. 38.5–39° (ether-petroleum ether).
[4] Ethyl acetoacetate.
[5] Product was extracted with ether in a continuous extractor from the sodium chloride-saturated reaction mixture.

TABLE III
Hydroxydiketones and their anhydrodisemicarbazones

| Compound[1] | Formula | Analysis | | | | M. P., °C. cor. | Anhydrodisemicarbazone | | | | |
|---|---|---|---|---|---|---|---|---|---|---|---|
| | | Per Cent Calculated | | Per Cent Found | | | Formula | Analysis | | | |
| | | | | | | | | Per Cent Calculated | | Per Cent Found | |
| | | C | H | C | H | | | C | H | C | H |
| A | $C_{10}H_{18}O_3$ | 64.48 | 9.74 | 64.10 | 9.56 | [2] 224–225 | $C_{12}H_{22}O_2N_6$ | 51.04 | 7.86 | 50.62 | 7.65 |
| B | $C_{10}H_{16}O_3$ | 65.19 | 8.76 | 64.75 | 8.79 | [2] 227–228 | $C_{12}H_{20}O_2N_6$ | 51.41 | 7.19 | 51.47 | 7.02 |
| C | $C_9H_{14}O_3$ | 63.51 | 8.29 | 62.82 | 8.05 | [2] 228–229 | $C_{11}H_{18}O_2N_6$ | 49.61 | 6.81 | 49.65 | 6.85 |
| D | $C_{10}H_{16}O_3$ | 65.19 | 8.76 | 65.28 | 8.38 | [2] 225–226 | $C_{12}H_{20}O_2N_6$ | 51.41 | 7.19 | 50.76 | 6.80 |
| E | do | 65.19 | 8.76 | 65.01 | 8.52 | {[2] 220–221, [2] 214–215} | $C_{12}H_{20}O_2N_6$ | 51.41 | 7.19 | 51.70 | 6.98 |
| F | $C_{11}H_{18}O_3$ | 66.64 | 9.15 | 66.80 | 8.75 | [2] 238–239 | | | | | |
| G | $C_{14}H_{18}O_3$ | 72.39 | 6.94 | 72.56 | 6.85 | | | | | | |

[1] See Table II for the compounds.
[2] Recrystallized from acetic acid, melts with decomposition.
[3] Recrystallized from 95% ethanol, melts with decomposition.

TABLE IV
Compounds of Formula II and Their Disemicarbazones

| | Compound, Formula II | | M. P., °C. cor. | Formula | Analysis | | | | Disemicarbazone, M. P., °C. cor. |
|---|---|---|---|---|---|---|---|---|---|
| | R | R' | | | Per Cent Calculated | | Per Cent Found | | |
| | | | | | C | H | C | H | |
| A | –n–$C_4H_9$ | –$CH_3$ | [1] 52–53 | $C_{10}H_{16}O_2$ | 71.39 | 9.59 | 71.27 | 9.44 | {[2][3] 228–229, [4] 224–225} |
| B | –$CH_2CH=CHCH_3$ | –$CH_3$ | [1] 52–53 | $C_{10}H_{14}O_2$ | 72.26 | 8.49 | 71.74 | 8.35 | [2] 231–232 |
| C | –$CH_2CH=CH_2$ | –$CH_3$ | [5] oil | | | | | | {[4] 228–229} |
| E | –$CH_2CH_2CH=CH_2$ | –$CH_3$ | [5] oil | | | | | | {[2] 220–221, [4] 214–215} |

[1] Recrystallized from petroleum ether.
[2] Recrystallized from 95% ethanol, melts with decomposition.
[3] Anal., Calc'd for $C_{12}H_{22}O_2N_6$: C, 51.04; H, 7.86; found: C, 51.39; H, 7.94.
[4] Recrystallized from acetic acid, melts with decomposition.
[5] Crystallized in refrigerator, melts on warming.

those used to prepare the beta-keto esters of Table V.

3-chloro-2-buten-1-ol [1]

To a solution of 106 g. (1.0 mole) anhydrous sodium carbonate in 890 ml. of water containing 1 g. of hydroquinone was added 125 g. (1.0 mole) of 1,3-dichloro-2-butene. After refluxing for five hours with stirring, the reaction mixture was saturated with sodium chloride, cooled, and extracted several times with ether. The ether extracts were combined, dried over sodium sulfate, the solvent was removed, and the residue fractionated, yielding 82 g. (77%) B. P. 90-93° at 50 mm., $n_D^{25}$ 1.4650.

2-butyl-1-ol [1]

To a refluxing solution of 118 g. of 85% potassium hydroxide (1.79 moles) in 138 ml. of water, 171 g. (1.61 moles) of 3-chloro-2-buten-1-ol was added during a period of one-half hour. Stirring and refluxing were discontinued after two more hours. After standing overnight, the reaction mixture was saturated with carbon dioxide, heated to reflux temperature, cooled and extracted several times with ether. The ether extracts were combined, dried over sodium sulfate, the solvent distilled off and the residue fractionated yielding 83.7 g. (75%), B. P. 82-92° at 95 mm., $n_D^{25}$ 1.4529.

1-chloro-2-butyne

One hundred and two grams (1.46 moles) of 2-butyn-1-ol and 26 g. of pyridine were placed in a three-necked flask equipped with a mercury-sealed stirrer, thermometer, and dropping funnel. After cooling to —10°, 82 g. (0.60 mole) of phosphorous trichloride was slowly added during a period of one hour. A slurry of crystals formed which dissolved on warming to room temperature. The reaction mixture was warmed to about 90-100° for a short time, whereupon a reaction took place with the formation of two layers. The upper layer was separated in a separatory funnel, filtered through a plug of cotton which had been moistened with low-boiling petroleum ether and distilled, yielding 49.5 g., B. P. 104-106° and an additional 34.6 g., B. P. about 55° at 35 mm. These fractions were combined, dissolved in low-boiling petroleum ether, and then washed with ice water. After drying with $CaCl_2$, the solvent was removed and residue distilled, the purified product boiling at 104-106° (760 mm.), 71.5 g. (55% yield), $n_D^{25}$ 1.4570.

ALPHA-SUBSTITUTED ACETOACETIC ESTERS

2-acetyl-5-chloro-4-pentenoic acid, ethyl ester [ethyl alpha-(3-chloroallyl) acetoacetate]

Forty-six grams (2.0 moles) of sodium was dissolved in 600 ml. of absolute ethanol. After cooling, 286 g. (2.2 moles) of ethyl acetoacetate was added with stirring, followed by 222 g. (2.0 moles) of 1,3-dichloro-1-propene. After sixteen hours at room temperature, the reaction mixture was refluxed for four hours with stirring and after being cooled was neutralized by the addition of a little acetic acid. The sodium chloride was filtered off and the filtrate submitted to vacuum distillation, yielding 267 g. (65%), B. P. 142-147° (20 mm.), $n_D^{25}$ 1.4600.

[1] Prepared by the method described by Hatch and Nesbitt, J. Am. Chem. Soc., 72, 727 (1950).

Anal. Calcd. for $C_{19}H_{13}O_3Cl$: $OC_2H_5$, 22.0; Cl, 17.3. Found: $OC_2H_5$, 21.1; Cl, 16.9.

2-acetyl-4-chloro-4-pentenoic acid, ethyl ester [ethyl alpha-(2-chloroallyl) acetoacetate]

This ester was prepared in the same manner employing 2,3-dichloro-1-propene to alkylate ethyl acetoacetate in 22.5% yield; B. P. 126-128° (20 mm.), $n_D^{25}$ 1.4558.

Anal. Calcd. for $C_{19}H_{13}O_3Cl$: $OC_2H_5$, 22.0; Cl, 17.3. Found: $OC_2H_5$, 20.2; Cl, 18.4.

2 - acetyl - 5 - chloro - 4 - hexenoic acid, ethyl ester [ethyl alpha-(3-chloro-2-butenyl) acetoacetate]

This ester was prepared in the same manner employing 1,3-dichloro-2-butene to alkylate ethyl acetoacetate in 76% yield, B. P. 95-112° (0.5 mm.), $n_D^{25}$ 1.4613.

Anal. Calcd. for $C_{20}H_{15}O_3Cl$: $OC_2H_5$, 20.6. Found: $OC_2H_5$, 20.0.

A small portion was redistilled; B. P. 80-84° (0.05 mm.), $n_D^{25}$ 1.4605.

2-acetyl-4-hexynoic acid, ethyl ester [ethyl alpha-(2-butynyl) acetoacetate]

This ester was prepared in the same manner employing 8.4 g. of sodium, 125 ml. of absolute ethanol, 50 g. (0.39 mole) of ethyl acetoacetate, and 31 g. (0.35 mole) of 1-chloro-2-butyne. The yield of product boiling at 128-138° (15 mm.), $n_D^{25}$ 1.4530, was 40.6 g. (64%).

Anal. Calcd. for $C_{10}H_{14}O_3$: $OC_2H_5$, 24.7. Found: $OC_2H_5$, 24.6.

KETONES FOR PREPARATION OF ESTERS OF TABLE V

6-chloro-5-hexen-2-one

To an ice-cold solution of 100 g. of potassium hydroxide (85%) in 1 2 l. of water was added 247 g. (1.2 moles) of ethyl 2-acetyl-5-chloro-4-pentenoate with stirring. After standing in the refrigerator at about 5° for five days, sulfuric acid (1:1) was added until the solution was acid to Congo red paper. It was refluxed a short time until evolution of carbon dioxide ceased, then cooled, and extracted several times with ether. The ether extracts were combined, washed with dilute alkali, and with saturated salt solution, and then dried over sodium sulfate. The solvent was removed and the residue distilled yielding 115 g. (72%), B. P. 80-93° (17 mm.). A portion was redistilled to obtain a purer sample, B. P. 80-81° (17 mm.), $n_D^{25}$ 1.4540.

Anal. Calcd. for $C_6H_9OCl$: Cl, 28.8. Found: Cl, 25.8.

Its semicarbazone melted at 123-124°.

Anal. Calcd. for $C_7H_{12}OClN_3$: N, 22.1. Found: N, 21.1.

5-chloro-5-hexen-2-one

This ketone was prepared in the same manner from ethyl 2 - acetyl - 4 - chloro - 4 - pentenoate in 37% yield; B. P. 72-82° at 17 mm., $n_D^{25}$ 1.4480.

Its semicarbazone melted at 139-140°.

Anal. Calcd. for $C_7H_{12}OClN_3$: N, 22.1. Found: N, 21.9.

6-chloro-5-hepten-2-one

This ketone was also prepared in the same manner employing 50 g. of sodium hydroxide dissolved in 330 ml. of water and 244 g. (1.12 moles) of ethyl 2-acetyl-5-chloro-4-hexenoate. The yield was 137 g. (83%), B. P. 88-90° at 15 mm., $n_D^{25}$ 1.4571.

Anal. Calcd. for $C_7H_{11}OCl$: Cl, 24.2. Found: Cl, 23.6.

Its semicarbazone melted at 137–138°.

Anal. Calcd. for $C_8H_{14}OClN_3$: Cl, 17.4. Found: Cl, 17.0.

5-heptyn-2-one

This ketone was prepared in the same manner employing 15.3 g. of 85% potassium hydroxide dissolved in 150 ml. of water and 40.6 g. (0.22 mole) of ethyl 2-acetyl-4-hexynoate. The yield was 17 g. (69%), B. P. 75–77° at 18 mm., $n_D^{25}$ 1.4472.

Anal. Calcd. for $C_7H_{10}O$: C, 76.32; H, 9.15. Found: C, 74.97, 74.90, 75.03; H, 8.94, 9.06.

Its semicarbazone melted at 175–176°.

Anal. Calcd. for $C_8H_{13}ON_3$: C, 57.46; H, 7.84. Found: C, 57.14; H, 7.85.

GAMMA-SUBSTITUTED ACETOACETIC ESTERS

The beta-keto esters listed in Table V were prepared employing the general procedures described by Soloway and La Forge, J. Am. Chem. Soc. 69, 2677 (1947); Green and La Forge, J. Am. Chem. Soc. 70, 2287 (1948); and Schechter, Green, and La Forge, J. Am. Chem. Soc. 71, 1517, 3165 (1949), which involve the carbethoxylation of the ketones by reaction with ethyl carbonate employing sodium hydride as condensing agent, except for compound E which was prepared as follows:

2-allyl-3-oxo-6-heptenoic acid, ethyl ester

Six and four-tenths grams of sodium was dissolved in 170 ml. of absolute ethanol, the solution was cooled, and 50 g. (0.29 mole) of ethyl 3-oxo-6-heptenoate[1] added during five minutes followed by the addition of 24 g. (0.31 mole) of allyl chloride with stirring. After standing overnight, the reaction mixture was refluxed for four hours with stirring. The sodium chloride was filtered off and the filtrate was submitted to distillation, the alcohol being removed as a fore-run. The physical constants of the product are given in Table V.

85% potassium hydroxide per 50 ml. of solution). After four days at 5° C., the solution was saturated with carbon dioxide. Fifteen grams of pyruvaldehyde diisopropyl acetal (0.086 mole) was refluxed with 15 ml. of 2% sulfuric acid with stirring until homogeneous and then twenty minutes more (about two hours total) after which the solution was cooled in an ice bath, neutralized by the careful addition of sodium bicarbonate and then added to the solution of saponified ester described above. After one day at room temperature, the reaction mixture was extracted with ether, the ether extract was washed with saturated salt solution, dried over anhydrous sodium sulfate and the solvent removed. Distillation in high vacuum yielded 7.6 g. (48%) of product, B. P. 110–114° (0.2 mm.), $n_D^{25}$ 1.4853.

9-chloro-3-hydroxy-8-nonene-2,5-dione

This hydroxydiketone was prepared in the same manner as described above. From 40.9 g. of ethyl 7-chloro-3-oxo-6-heptenoate there was obtained 31.5 g. of crude product. Distillation of a few grams of this gave a pale yellow distillate, B. P. 113–116° at 0.2 mm., $n_D^{25}$ 1.4905 which, however, darkened and polymerized in a few hours. Hence, the crude product was employed for cyclization to the cyclopentenolone.

9-chloro-3-hydroxy-8-decene-2,5-dione

This compound was prepared in the same manner from 40 g. (0.18 mole) of ethyl 7-chloro-3-oxo-6-octenoate and 35.1 g. (0.20 mole) of pyruvaldehyde diisopropyl acetal (hydrolyzed by refluxing with an equal weight of 2% sulfuric acid solution). The yield was 25.8 g. (64.5%), B. P. 134–137° at 0.5 mm., $n_D^{25}$ 1.4873. A middle cut used for analysis had $n_D^{25}$ 1.4894.

Anal. Calcd. for $C_{10}H_{15}O_3Cl$: Cl, 16.2 Found: Cl, 16.3.

TABLE V
Beta-keto-esters

| | Beta-Keto Ester | Yield Per Cent | Boiling Point | | $n_D^{25}$ | Formula | Analyses | | | |
|---|---|---|---|---|---|---|---|---|---|---|
| | | | | | | | Calcd. | | Found | |
| | | | °C. | mm. | | | Per Cent $OC_2H_5$ | Per Cent Cl | Per Cent $OC_2H_5$ | Per Cent Cl |
| A | Ethyl 7-chloro-3-oxo-6-heptenoate. | 76 | 90–100 | 0.2 | 1.4640 | $C_9H_{13}O_3Cl$ | 22.0 | | 21.3 | |
| B | Ethyl 6-chloro-3-oxo-6-heptenoate. | 27.5 | 85–95 | 0.2 | 1.4618 | $C_9H_{13}O_3Cl$ | | 17.3 | | 17.7 |
| C | Ethyl 7-chloro-3-oxo-6-octenoate. | 71 | 87–90 | 0.15 | 1.4642 | $C_{10}H_{15}O_3Cl$ | 20.6 | 16.2 | 20.7 | 15.7 |
| D | Ethyl 3-oxo-6-octynoate | 63 | 77–83 | 0.1 | 1.4578 | $C_{10}H_{14}O_3$ | 24.7 | | 25.4 | |
| E | Ethyl 2-allyl-3-oxo-6-heptenoate. | 75 | 130–137 | 18 | 1.4516 | $C_{12}H_{18}O_3$ | 21.4 | | 21.4 | |

HYDROXYDIKETONES

The following is an example of the general procedure used for preparing the hydroxydiketones from the beta-keto esters of Table V, particularly.

8-chloro-3-hydroxy-8-nonene-2,5-dione

Sixteen grams of ethyl 6-chloro-3-oxo-6-heptenoate (0.078 mole) was dissolved in 50 ml. of ice-cold potassium hydroxide solution (5.9 g. of

4-allyl-3-hydroxy-8-nonene-2,5-dione

This compound was prepared by the general procedure for hydroxydiketones described above from 21.0 g. (0.1 mole) of ethyl 2-allyl-3-oxo-6-heptenoate. After saponification with aqueous alkali in the refrigerator for several days, 5.5 g. of oil which was floating on the surface was removed. This oil may have contained some unsaponified ester and some ethyl 2,2-diallyl-3-oxo-6-heptenoate. After removal of the oil, the alkaline solution was neutralized with carbon di- ---
[1] Schechter, Green, and La Forge, J. Am. Chem. Soc. 71, 3165 (1949).

oxide and mixed with pyruvaldehyde obtained by the acid hydrolysis and subsequent neutralization of 14.2 g. (0.082 mole) of pyruvaldehyde diisopropyl acetal. The reaction mixture, upon being worked up in the usual manner gave 4.6 g. (30% yield on the basis of 15.5 g. of ethyl 2-allyl-3-oxo-6-heptenoate actually utilized) of product, B. P. 110–120° (0.2 mm.) $n_D^{25}$ 1.4790.

*3-hydroxy-8-decyne-2,5-dione*

This compound was prepared by the general procedure for hydroxydiketones described above from 17.9 g. (0.098 mole) of ethyl 6-octynoate and 19.0 g. (0.11 mole) of pyruvaldehyde diisopropyl acetal (hydrolyzed by refluxing with an equal weight of 2% sulfuric acid solution). The yield was 11.5 g. (64.5%), B. P. 110–115° (0.1 mm.), $n_D^{25}$ 1.4812.

Anal. Calcd. for $C_{10}H_{14}O_3$: C, 65.91; H, 7.74. Found: C, 65.63; H, 7.76.

Its anhydrodisemicarbazone recrystallized from acetic acid melted at 226–227° (dec.).

Having thus described our invention, we claim:

1. 3-hydroxy-8-decene-2,5-dione.
2. 3-hydroxy-8-nonene-2,5-dione.
3. 3-hydroxy-8-methyl-8-nonene-2,5-dione.
4. 3-hydroxy-9-decene-2,5-dione.
5. 2-hydroxy-1-phenyl-7-octene-1,4-dione.
6. The compound of the formula 3-hydroxy-8-decene-2,5-dione, the anhydrodisemicarbazone of which melts at 227–228° C. with decomposition.
7. A compound of the group consisting of: 3-hydroxy-8-decene-2,5-dione; 3-hydroxy-8-nonene-2,5-dione; 3-hydroxy-8-methyl-8-nonene-2,5-dione; 3-hydroxy-9-decene-2,5-dione; 3-hydroxy-9-methyl-8-decene-2,5-dione; and 2-hydroxy-1-phenyl-7-octene-1,4-dione.
8. A compound of the formula:

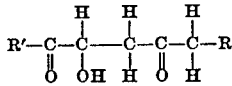

in which R' is a hydrocarbon radical and R is an alkenyl radical.

9. A compound of the formula:

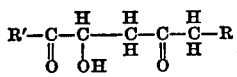

in which R' is a hydrocarbon radical; and R is a radical having a chain of carbon atoms directly linked to the formula residue, said chain having an unsaturated, non-aromatic, carbon to carbon bond.

10. A 1,4-dioxo-2-hydroxy compound of the formula:

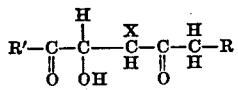

in which R' is a hydrocarbon radical; R is a radical having a chain of carbon atoms directly linked to the formula residue, said chain having an unsaturated, non-aromatic, carbon to carbon bond; and X is a radical taken from the group consisting of H and allyl.

11. The process of making 3-hydroxy-8-nonene-2,5-dione comprising reacting pyruvaldehyde with a faintly alkaline solution of an alkali metal salt of 3-oxo-6-heptenoic acid.

12. A method of preparing a hydroxydiketone of the formula: R'—CO—CHOH—CH₂—COCH₂R comprising reacting a glyoxal of the formula: R'—CO—CHO with a beta-keto compound of the formula: R—CH₂—CO—CH₂—COOH, at a pH of about 5 to 9; R' being a hydrocarbon radical; R being an alkenyl radical.

13. A method of preparing a hydroxydiketone of the formula:

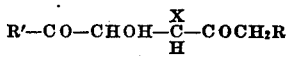

comprising reacting a glyoxal of the formula:

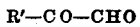

with a beta-keto compound of the formula:

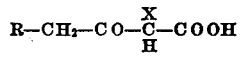

at a pH of about 5 to 9; R' being a hydrocarbon radical; R is a radical having a chain of carbon atoms directly linked to the formula residue, said chain having an unsaturated, non-aromatic, carbon to carbon bond; and X is a radical taken from the group consisting of H and allyl.

14. A method of preparing a hydroxydiketone of the formula:

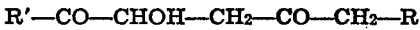

comprising reacting a glyoxal of the formula: R'—CO—CHO with a faintly alkaline solution of a salt of a beta-keto acid of the formula: R—CH₂—CO—CH₂—COOH, R' being taken from the group consisting of alkyl, alkenyl, and aryl radicals, R being taken from the group consisting of alkyl, alkenyl, substituted alkenyl, aryl, aralkyl, cycloalkyl, and cycloalkenyl radicals, extracting the hydroxydiketone from the alkaline reacting mixture and distilling it in high vacuum.

15. The process of claim 14 in which the extraction is with ether.

16. A method of preparing a hydroxydiketone of the formula:

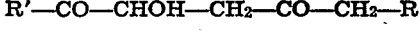

comprising reacting a glyoxal of the formula: R'—CO—CHO with a slightly acid solution of a beta-keto acid of the formula:

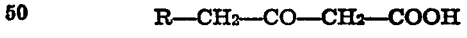

R' being taken from the group consisting of alkyl, alkenyl, and aryl radicals, R being a radical having a chain of carbon atoms directly linked to the formula residue, said chain having an unsaturated, non-aromatic, carbon to carbon bond.

17. A method of preparing a hydroxydiketone of the formula:

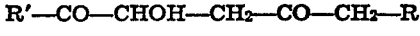

comprising reacting a glyoxal of the formula: R'—CO—CHO with a faintly alkaline solution of a salt of a beta-keto acid of the formula:

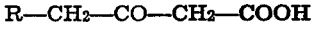

R' being taken from the group consisting of alkyl, alkenyl and aryl radicals, R being an alkenyl radical.

18. A method of preparing a hydroxydiketone of the formula:

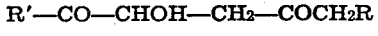

comprising reacting a glyoxal of the formula: R'—CO—CHO with a beta-keto compound of the formula: R—CH₂—CO—CH₂—COOH, at an alkaline pH not higher than about 9; R' being a hydrocarbon radical; R being an alkenyl radical; and directly extracting the hydroxydiketone from the alkaline reaction mixture with ether and distilling it in high vacuum.

MILTON S. SCHECHTER.
FREDERICK B. LA FORGE.

REFERENCES CITED

The following references are of record in the file of this patent:

UNITED STATES PATENTS

| Number | Name | Date |
| --- | --- | --- |
| 2,387,587 | Hunsdiecker | Oct. 23, 1945 |

OTHER REFERENCES

Henze: Z. physiol. Chem., vol. 189, pages 121–126 (1930). Abstracted in Chemical Abstracts, vol. 24, col. 4267 (1930).

Henze et al.: Z. physiol. Chem., vol. 193, pages 88–96 (1930). Abstracted in Chemical Abstracts, vol. 25, col. 494 (1931).